(12) United States Patent
Klemm et al.

(10) Patent No.: US 9,551,450 B2
(45) Date of Patent: Jan. 24, 2017

(54) PIPELINE PIG SIGNAL TRIGGER CAVITY SEAL

(71) Applicant: TDW Delaware, Inc., Wilmington, DE (US)

(72) Inventors: Nathan Klemm, Tulsa, OK (US); Matt Logan, Tulsa, OK (US); Michael Vaughn, Ketchum, OK (US)

(73) Assignee: TDW Delaware, Inc., Wilmington, DE (US)

( * ) Notice: Subject to any disclaimer, the term of this patent is extended or adjusted under 35 U.S.C. 154(b) by 0 days.

(21) Appl. No.: 15/011,946

(22) Filed: Feb. 1, 2016

(65) Prior Publication Data

US 2016/0195215 A1   Jul. 7, 2016

Related U.S. Application Data

(62) Division of application No. 13/669,989, filed on Nov. 6, 2012, now Pat. No. 9,248,477.

(51) Int. Cl.
| | |
|---|---|
| *B08B 9/027* | (2006.01) |
| *F16L 55/48* | (2006.01) |
| *F16J 15/02* | (2006.01) |
| *F16J 15/06* | (2006.01) |
| *G01D 13/00* | (2006.01) |

(52) U.S. Cl.
CPC ............... *F16L 55/48* (2013.01); *B08B 9/027* (2013.01); *F16J 15/02* (2013.01); *F16J 15/064* (2013.01); *G01D 13/00* (2013.01)

(58) Field of Classification Search
CPC .......... G01D 13/00; F16J 55/48; F16J 15/064; F16J 15/02; B08B 9/027; B08B 9/055; F16L 55/48

See application file for complete search history.

(56) References Cited

U.S. PATENT DOCUMENTS

| | | | |
|---|---|---|---|
| 3,327,677 A | 6/1967 | King | |
| 3,478,717 A * | 11/1969 | Kidd | H01H 35/00 116/204 |
| 4,042,248 A | 8/1977 | Williamitis | |
| 4,079,619 A | 3/1978 | Dobesh | |
| 4,491,018 A | 1/1985 | Stringer et al. | |
| 4,658,646 A | 4/1987 | Bell et al. | |
| 5,263,220 A * | 11/1993 | Campbell | G01B 7/001 15/104.063 |
| 5,279,251 A * | 1/1994 | Bierman | G01D 5/06 116/204 |
| 5,743,002 A * | 4/1998 | Ito | H01R 43/005 29/450 |
| 6,318,730 B1 | 11/2001 | Neely | |

(Continued)

OTHER PUBLICATIONS

Sterlitech online brochure: Delrin osmosis cell, downloaded May 19, 2015.

*Primary Examiner* — Natalie Huls
(74) *Attorney, Agent, or Firm* — Gable Gotwals

(57) ABSTRACT

A pipeline pig signal includes sealing means located within a lower end of the trigger cavity of the signal which prevents pipeline debris from entering the trigger cavity. The sealing means moves between a first sealing position and a second sealing position in response to the trigger moving between a non-triggered and triggered position. The sealing means may be a polymer boot, a filter arrangement, a sliding piston arrangement, or a sliding shelf arrangement.

7 Claims, 8 Drawing Sheets

(56) References Cited

U.S. PATENT DOCUMENTS

| | | | |
|---|---|---|---|
| 6,357,384 B1 | 3/2002 | Laymon et al. | |
| 6,789,407 B1 | 9/2004 | Poston et al. | |
| 6,823,751 B1 * | 11/2004 | Young | F16L 55/48 73/1.18 |
| 7,861,665 B2 | 1/2011 | Rankin | |
| 8,109,162 B2 | 2/2012 | Laymon et al. | |
| 2005/0223824 A1 | 10/2005 | Young | |
| 2008/0276859 A1 | 11/2008 | Rankin | |
| 2010/0096023 A1 | 4/2010 | Widdas | |

* cited by examiner

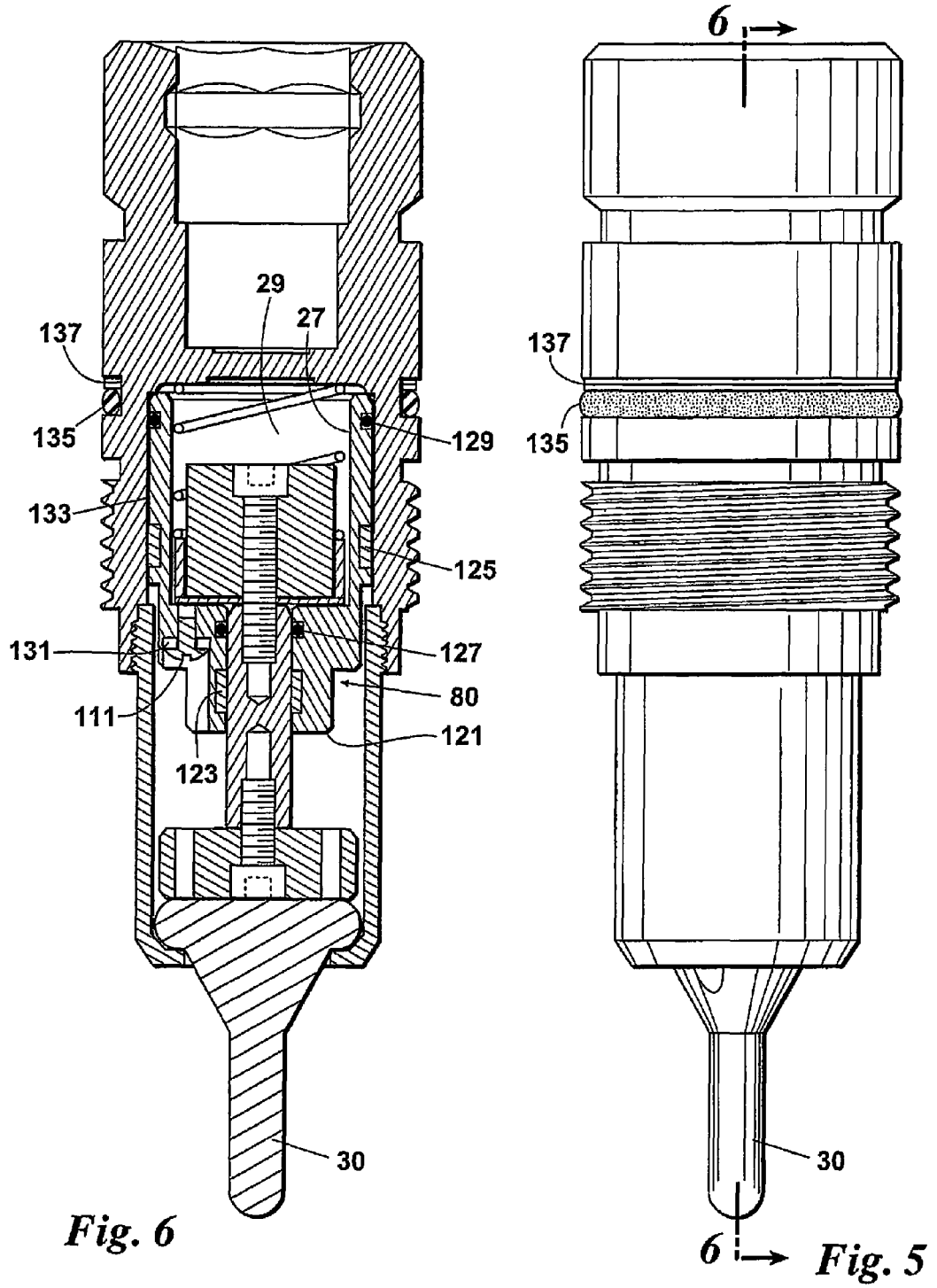

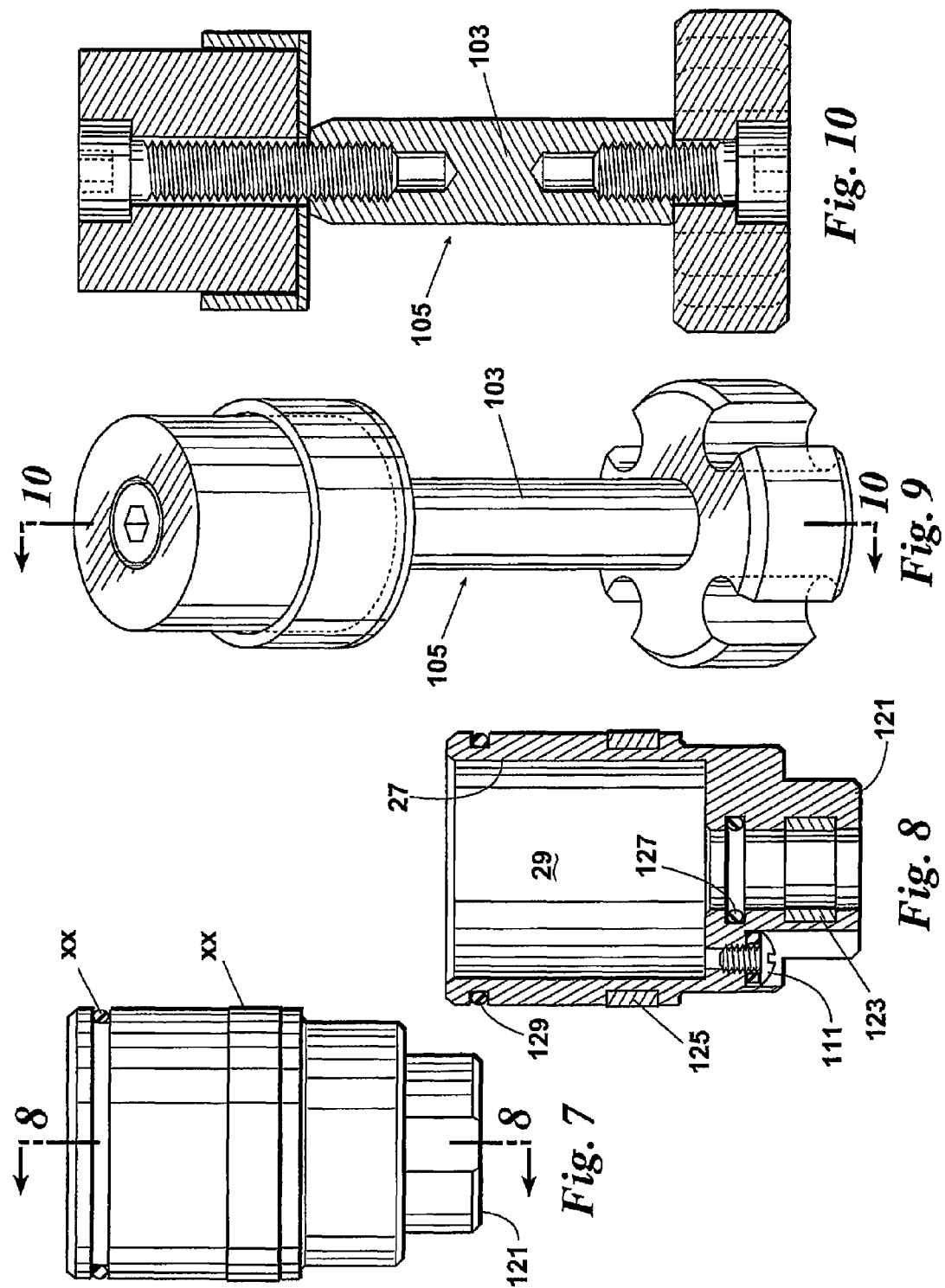

PIPELINE PIG SIGNAL TRIGGER CAVITY SEAL

BACKGROUND OF THE INVENTION

This invention relates generally to signals mounted on pipelines and used to indicate the passage of pipeline pigs. More particularly, the invention relates to pipeline pig signals that make use of magnet arrangements to trigger the release of a spring-loaded indicator flag. This type of pig signal is commonly referred to as a magnetic intrusive pig signal. An example of this type of signal is described in U.S. Pat. No. 7,861,665 to Rankin, the content of which is hereby incorporated by reference.

A magnetic intrusive pig signal typically includes a plug assembly and nipple combination, or a plug assembly and flange combination, that places the nipple in fluid communication with the interior of the pipeline. An o-ring or other equivalent sealing means is used to contain the pipeline pressure. Located within a cavity of the plug assembly is a trigger mechanism having polar opposite magnets. The trigger mechanism is in communication with the release mechanism of an indicator assembly that includes a flag or other device that indicates the passage of a pipeline pig. As a pipeline pig moves along the interior of the pipeline and past the magnetic intrusive pig signal, the pig urges against the trigger. This causes the lower magnet of the trigger mechanism to travel upward toward the upper magnet. As the upper magnet is repelled by the lower magnet, its mounting shaft urges against a release mechanism which activates the flag of the indicator assembly.

Although magnetic intrusive pig signals provide a number of advantages, this type of signal can be negatively affected from time-to-time by ferromagnetic debris such as metal flakes which are attracted to the lower repulsive magnet of the trigger mechanism. The debris can cause the trigger mechanism to jam because of the close fit and tolerances within the trigger cavity. Additionally, heavy waxy sludge sometimes enters the cavity and causes the trigger mechanism to jam. This can be particularly troublesome in the magnet area of the trigger cavity.

None of the prior art magnetic intrusive pig signals include means for preventing pipeline product, debris and sludge from entering the trigger cavity. Further, pig signals that employ non-magnetic trigger mechanisms have no means for preventing contamination of the trigger cavity.

SUMMARY OF THE INVENTION

A pipeline pig signal made according to this invention has a trigger cavity internal to the signal which houses at least a portion of a trigger that protrudes into an interior space of the pipeline. A sealing means is located toward a lower end of the trigger cavity and above the housed portion of the trigger. The sealing means prevents pipeline debris from entering a portion of the trigger cavity located above the sealing means.

The sealing means move between a first sealing position and a second sealing position in response to the trigger moving between a non-triggered and triggered position. This movement may come in the form of flexing to maintain fluid containment in the magnet area portion of the trigger cavity. The sealing means may be a polymer boot, a filter arrangement, a sliding piston arrangement, or a sliding shelf arrangement.

Objects of this invention are to (1) prevent ferromagnetic debris, dirt, heavy waxy sludge, and other contaminants from entering the magnet area of magnetic intrusive pig signal's trigger cavity; and (2) provide a sealing means that can be installed in and used to retrofit existing pig signal designs.

BRIEF DESCRIPTION OF THE DRAWINGS

FIG. 5 is a front elevation view of yet another embodiment of a pig signal made according to this invention.

FIG. 6 is a cross-section view of the pig signal of FIG. 5 taken along section line 5-5. The sealing means includes a sliding shelf design.

FIG. 7 is a front elevation view of the sliding shelf of FIG. 6.

FIG. 8 is a cross-section view of the sliding shelf of FIG. 6 taken along section line 8-8 of FIG. 7.

FIG. 9 is an isometric view of the magnet holder of the pig signal of FIG. 5.

FIG. 10 is a cross-section view of the magnet holder of FIG. 5 taken along section line 10-10 of FIG. 9.

ELEMENTS AND ELEMENT NUMBERING USED IN THE DRAWINGS AND DETAILED DESCRIPTION

| | |
|---|---|
| 20 | Pipeline pig signal |
| 22 | Indicator assembly |
| 24 | Plug assembly |
| 26 | Nipple/lower body |
| 27 | Inner wall of 29 |
| 28 | Internal cavity/trigger cavity |
| 29 | Magnet area |
| 30 | Trigger |
| 31 | Lower end |
| 32 | First magnet |
| 33 | O-ring |
| 35 | Plunger |
| 37 | Lower end |
| 38 | Groove |
| 39 | Wall of 35 |
| 40 | Flag |

-continued

| | |
|---|---|
| 44 | Indicator assembly body |
| 48 | Second O-ring |
| 50 | Set screws |
| 56 | Second magnet |
| 57 | Upper end |
| 71 | Shaft |
| 73 | Magnet holder |
| 80 | Sealing means |
| 81 | Seal |
| 83 | Upper end |
| 91 | Filter pack |
| 93 | Filtering material |
| 95 | Plastic washers |
| 97 | Flow-through holes |
| 101 | Sliding piston |
| 103 | Shaft |
| 105 | Magnet holder |
| 107 | Inner O-ring |
| 109 | Outer O-ring |
| 111 | Bleed screw |
| 121 | Floating shelf |
| 123 | Wear ring |
| 125 | Wear ring |
| 127 | Inner O-ring |
| 129 | Outer O-ring |
| 131 | O-ring washer |
| 133 | Outer circumferential surface |
| 135 | O-ring |
| 137 | Ring back-up |
| 141 | Sliding piston |
| 143 | Inner O-ring |
| 145 | Outer O-ring |
| 147 | Shaft |
| 149 | Magnet holder |
| 151 | Bleed screw |

DETAILED DESCRIPTION OF THE PREFERRED EMBODIMENTS

Each of the preferred embodiments of a pig signal made according to this invention includes a sealing means which prevents ferromagnetic debris, dirt, heavy waxy sludge and other contaminants from entering the magnet area of the signal.

Figure 1:
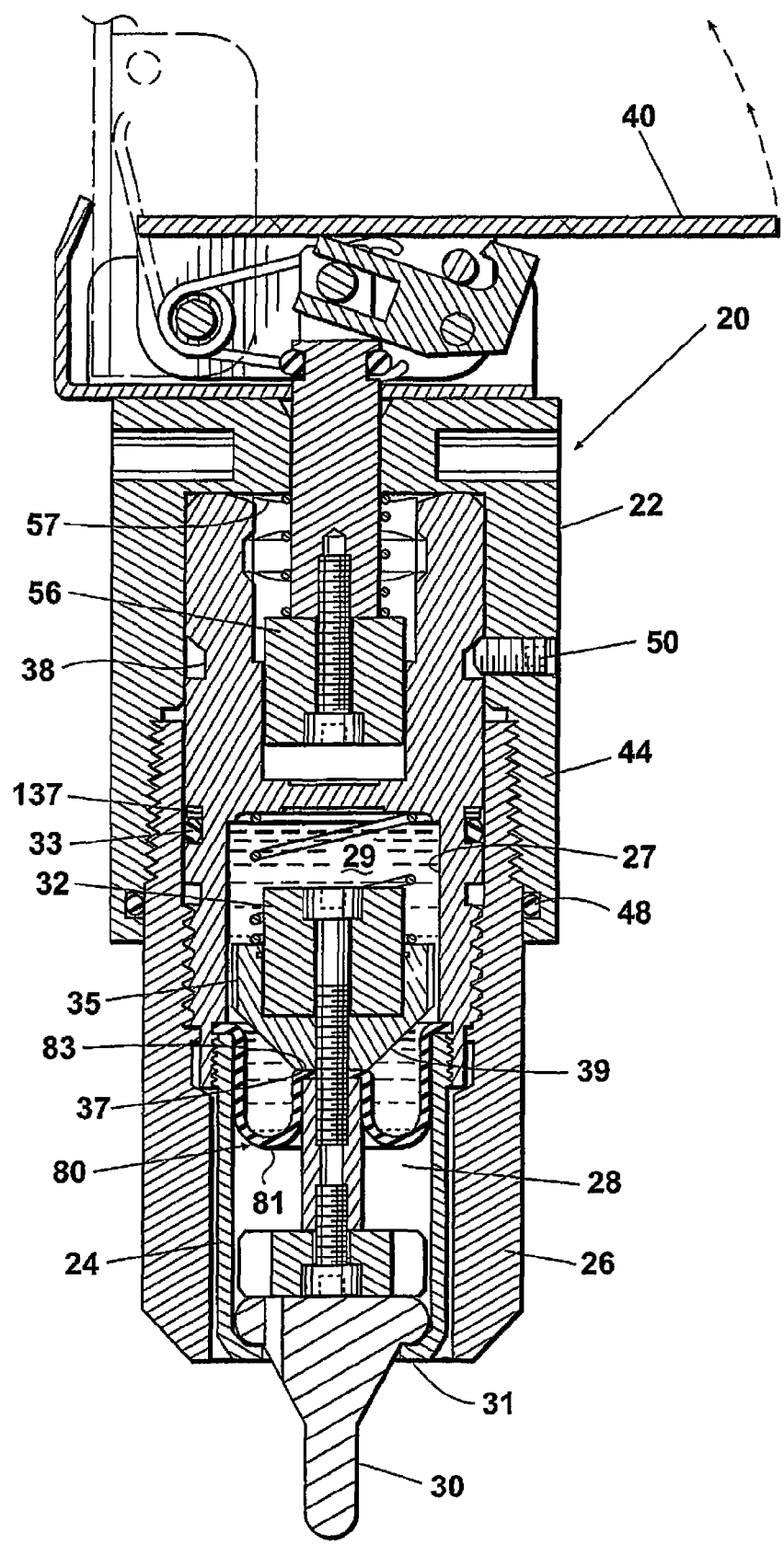
FIG. 1 is a cross-section view of a pig signal which includes a preferred embodiment of a trigger cavity sealing means made according to this invention. The sealing means includes a rubber boot having convolutes which provides containment of a pre-injected, incompressible fluid that prevents any pipeline product, debris and sludge from entering the magnet area of the trigger cavity.

Referring to the drawings and first to FIG. 1, a pipeline pig signal 20 is illustrated which includes an indicator assembly 22 received by and releaseably secured to a plug assembly 24. The pig signal is mounted to a pipeline and the indicator assembly 22 positioned in a desired clock orientation relative to the plug assembly 24 so that flag 40, when released, is visible to a pipeline operator. Set screws 50 engage a groove 38 and, when tightened against the groove, hold signal 20 in the desired orientation. (Each embodiment described herein provides this adjustable orientation means).

Plug assembly 24 receives a nipple or lower body 26 which, in turn, receives a trigger 30. Once pig signal 20 is secured to a pipeline, trigger 30 extends into the interior of the pipeline, thereby placing the interior cavity 28 of the lower body 26 in fluid communication with the interior of the pipeline. Pipeline pressure within the plug assembly 24 may be sealed off using an O-ring 33 or equivalent sealing means. O-ring 33 can include a back-up ring 137, preferably made of a TEFLON or equivalent material. A second O-ring 48 may be included which provides a seal between the nipple 26 and indicator assembly body 44 to prevent moisture and debris from entering the interior of the indicator assembly body 44 and causing corrosion or contamination of the release mechanism for flag 40. Alternatively, a breathable seal may be used in place of O-ring 48.

Trigger 30 resides within the internal cavity 28 of lower body 26. This internal cavity 28, which is fluid filled and may also be referred to as the trigger cavity 28, has a first magnet 32 located toward its lower end 31 and a second magnet 56 located toward its upper end 57. The area above first magnet 32 and below second magnet 56 is, for descriptive purposes, the magnet area 29 of trigger cavity 28. The magnets 32, 56 are opposite in polarity to one another.

As the pig moves along the pipeline and past the pipeline pig signal 20, the pig urges against the trigger 30 and causes the trigger 30 to move in axially upward within the plug assembly 24 and, therefore, the first magnet 32 to move between a first and second position toward the second magnet 56. As first magnet 32 moves toward second magnet 56, the second magnet 56 moves between a first and second position, upward and away from the first magnet 32. As the second magnet 56 continues its upward travel, flag 40 is released and pivoted into its activated position.

To prevent pipeline product, debris, and sludge from entering the trigger cavity 28, and particularly from entering the magnet area 29, sealing means 80 are provided toward the lower end 31 of the trigger cavity 28. Sealing means 80 may be a seal 81 which contains a pre-injected fluid (incompressible to balance pipeline pressure). Seal 81 prevents any pipeline product, debris and sludge from entering the magnet area 29 of the trigger cavity 28.

Seal 81 is preferably complementary in shape to the plunger 35 that moves the first magnet between the first and second position when a pipeline pig encounters trigger 30. In a preferred embodiment, plunger 35 is a frusto-conical shaped plunger whose lower end 37 urges against the opposing upper end 83 of seal 81, causing seal 81 to flex in sealing engagement with the opposing interior wall surface 27 of the trigger cavity 28 and the wall 39 of plunger 35. This flexing helps to maintain fluid containment in the magnet area 29. Seal 81 remains in sealing engagement as the plunger 35 moves between the first and second positions. No pipeline product, debris or sludge can pass through seal 81 and enter the magnet area 29. In another embodiment, seal 81 is a polymer or rubber boot with convolutes.

Figure 2:
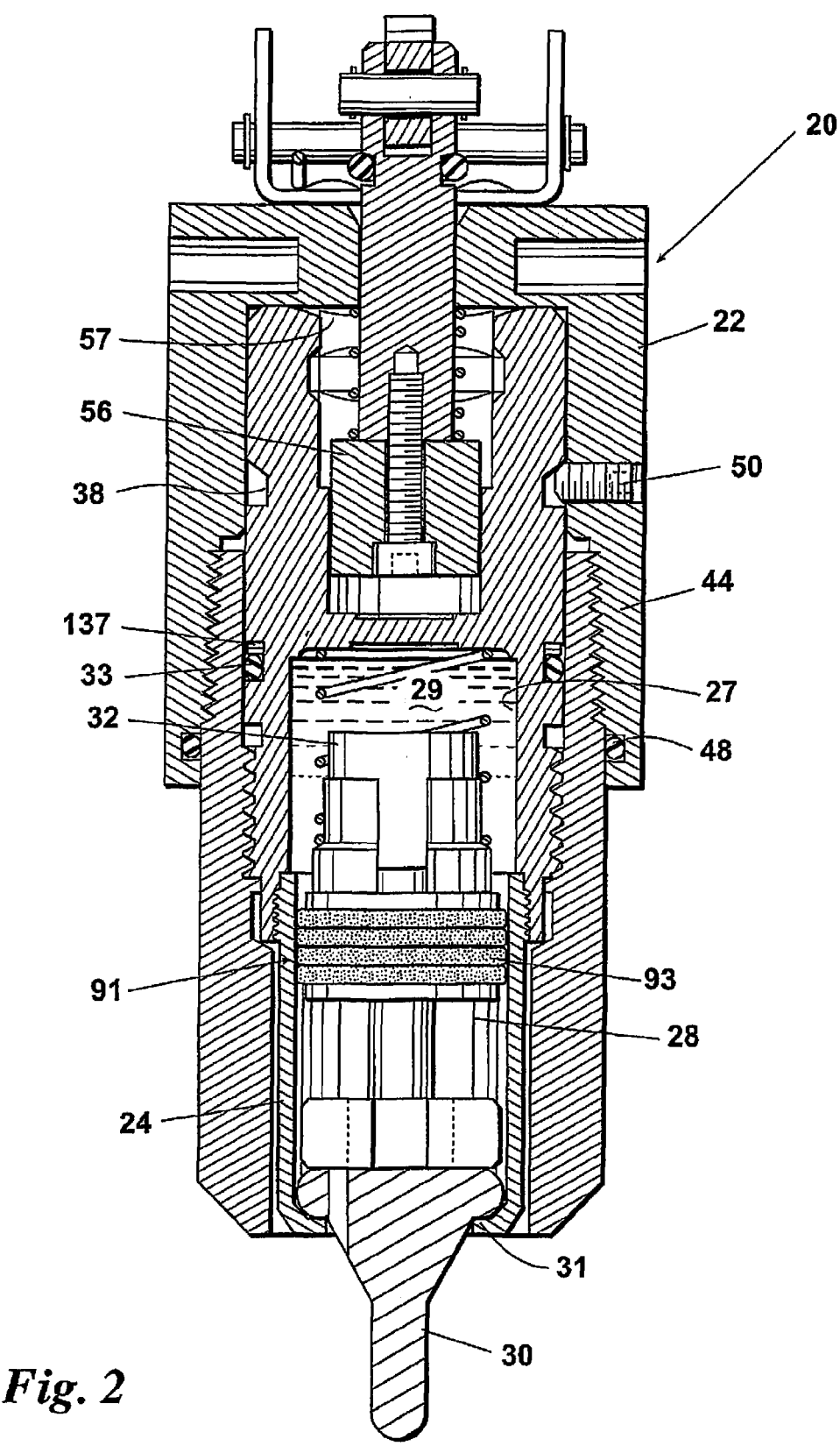
FIG. 2 is a cross-section view of a pig signal which includes another preferred embodiment of a trigger cavity sealing means made according to this invention. The sealing means includes a sliding filter pack which allows fluid to pass through it—while blocking debris—as the trigger mechanism strokes up and down as a pipeline pig passes the signal.
Figure 3:
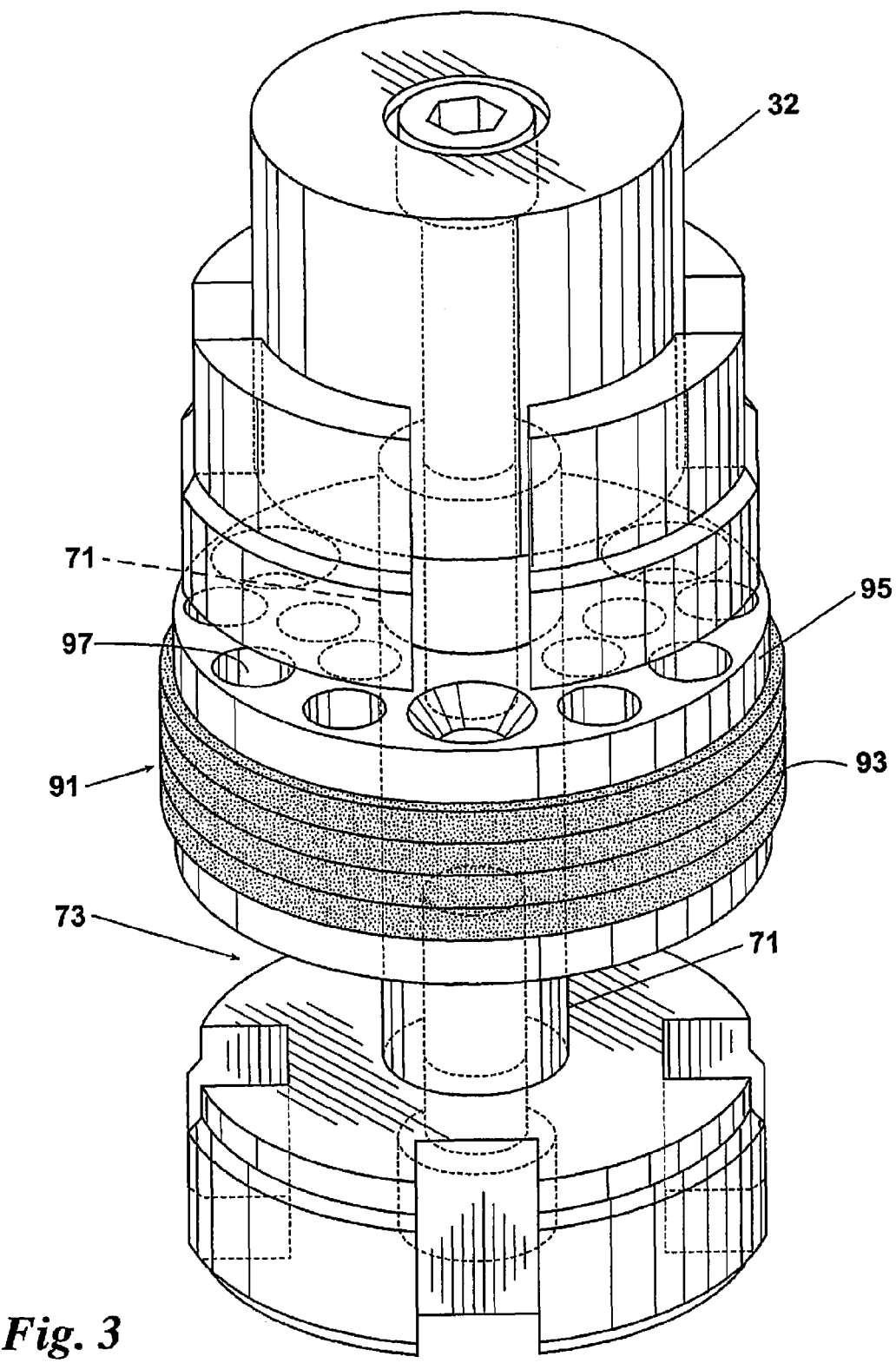
FIG. 3 is an isometric view of the sliding filter pack of FIG. 2.

Referring now to FIGS. 2 and 3A & B, an alternate embodiment of sealing means 80 is a sliding filter pack 91 arranged about the shaft 71 of magnet holder 73. Preferably, filter pack 91 is a stack of felt-type fabric layers 93 located between plastic washers 95 having flow-through holes 97. This arrangement allows pipeline fluid to pass through the filter pack 91 but not debris and sludge as plunger 35 moves between the first and second positions as trigger 30 is activated.

Figure 4A:
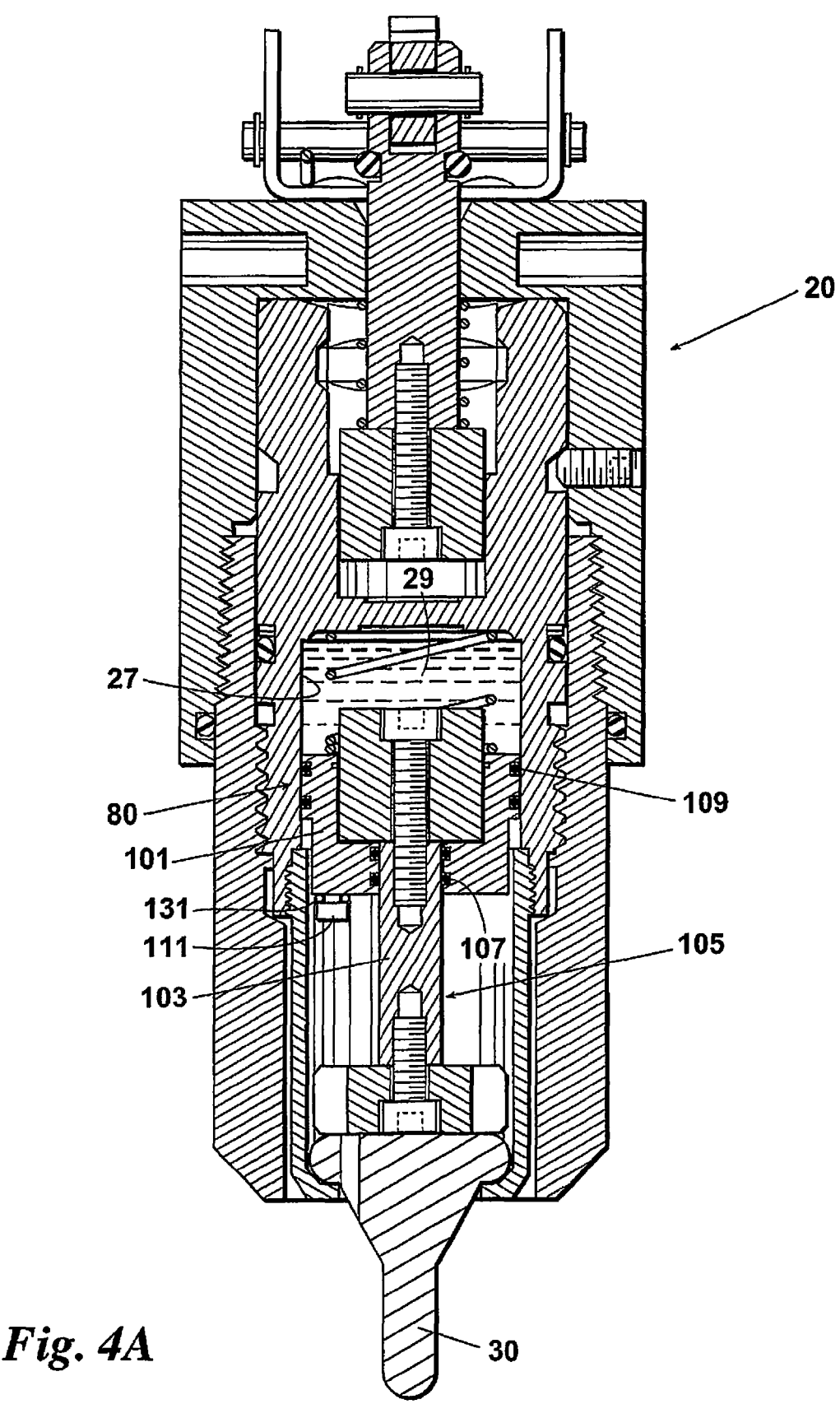
FIG. 4A is a cross-section view of another preferred embodiment of a pig signal made according to this invention, shown in its relaxed or non-triggered state. The sealing means includes a sliding piston.
Figure 4B:
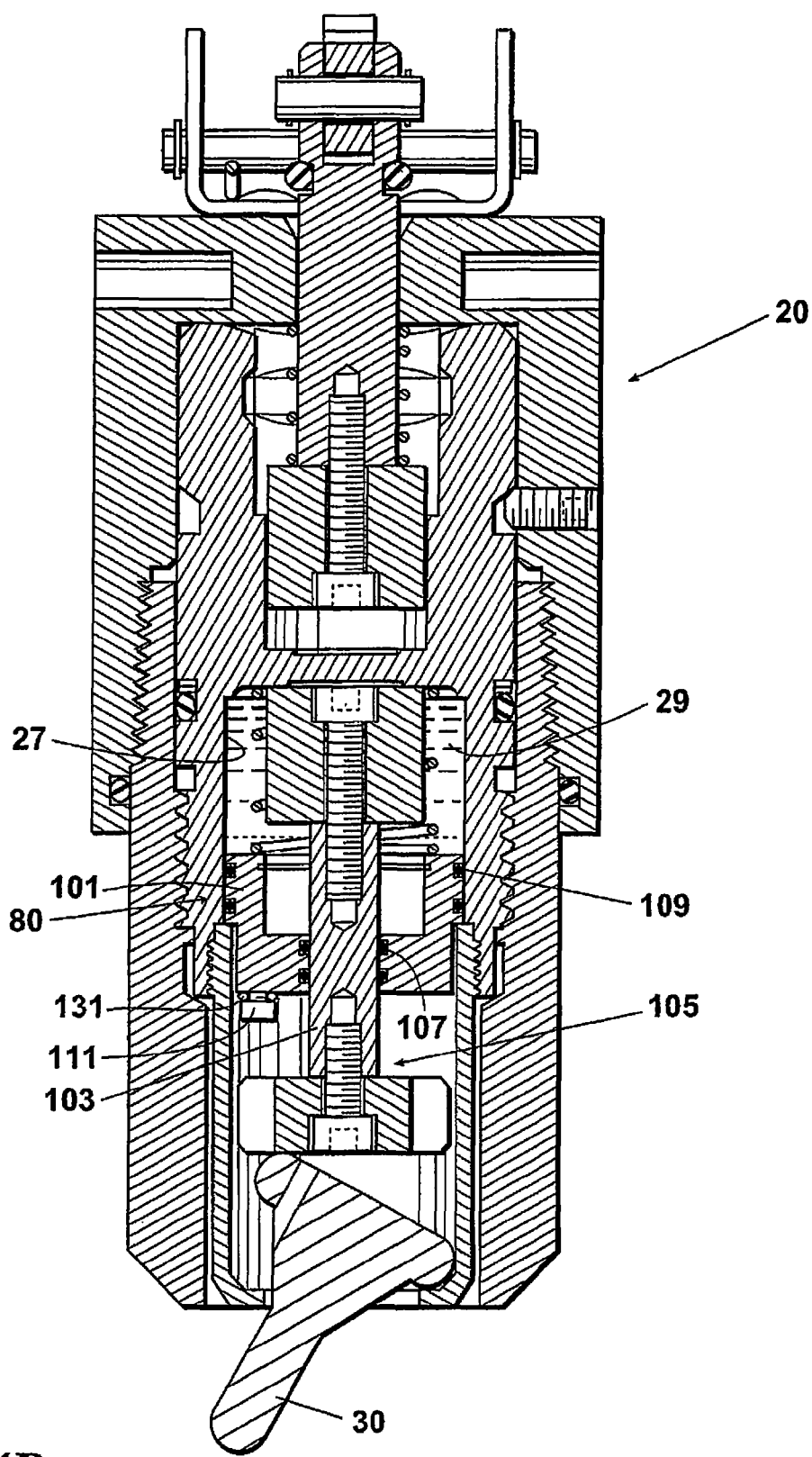
FIG. 4B is a cross-section view of the pig signal of FIG. 4A in its triggered state. The sliding piston moves downward in response to the signal being triggered.
Figure 11:
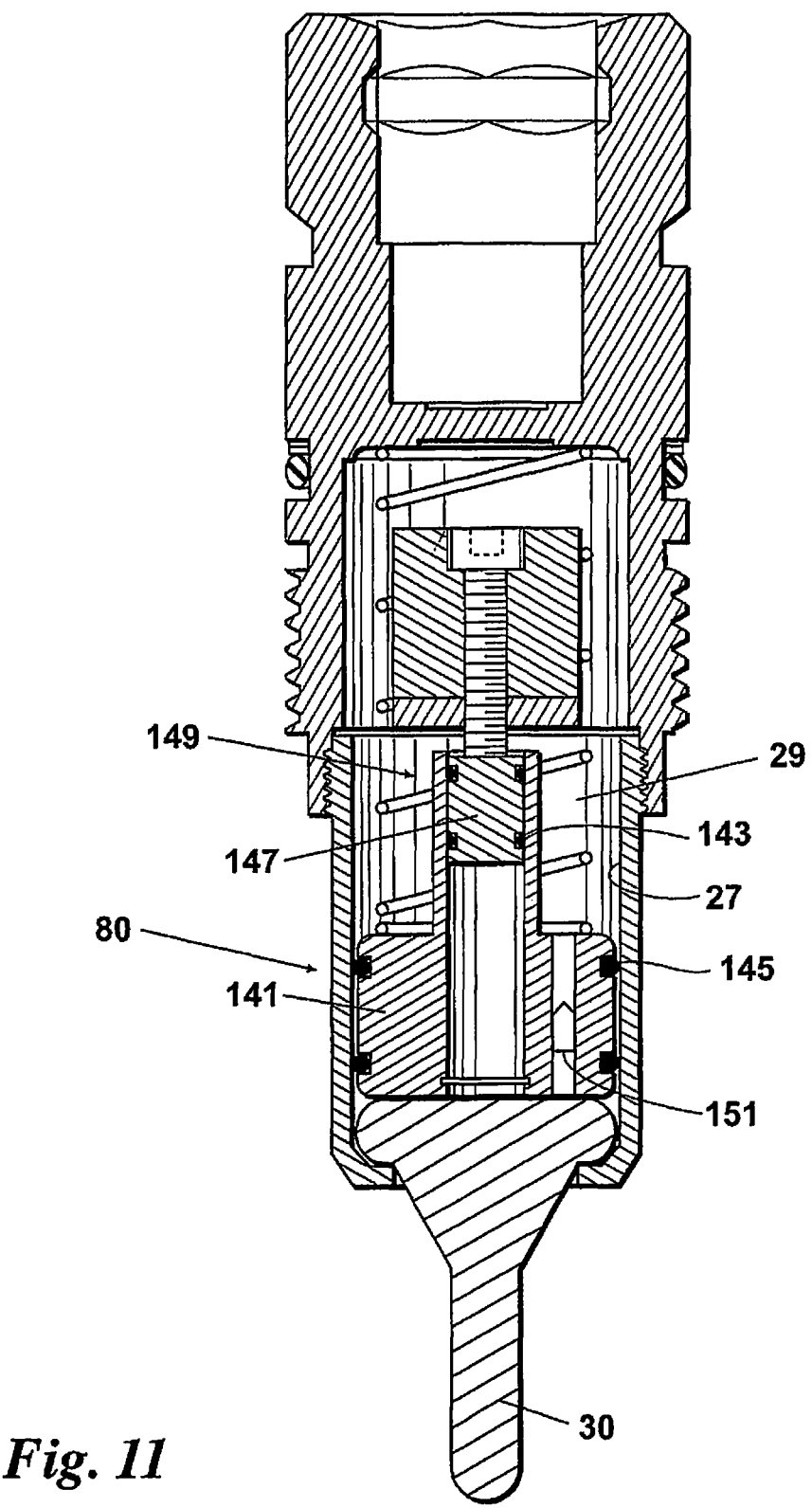
FIG. 11 is still yet another embodiment of a pig signal made according to this invention. The sealing means is a sliding piston design.

FIGS. 4A & B illustrate yet another preferred embodiment of sealing means 80, namely, a sliding piston 101. Sliding piston 101 is arranged about the shaft 103 of magnet holder 105. When pig signal 20 is triggered, the piston 101 slides downward as the magnet 32 moves upward. A pair of inner and outer O-rings 107, 109 provide, respectively, sealing means against the shaft 103 and the inner wall 27 of the fluid-filled magnet area 29. A bleed screw 111 allows insertion of fluid in area 29. The magnet area 29 is pre-filled with fluid and bleed screw 111 is used to bleed off the fluid until it reaches a desired level.

Referring now to FIGS. 5 to 10, sealing means 80 is a floating shelf 121. The shelf 121 includes an external O-ring 135 with optional ring back-up 137 preferably made of TEFLON or equivalent material. A wear ring 123 is positioned to surround the shaft 103 of magnet holder 105 and a wear ring 125 is positioned about the outer circumferential surface 133 of shelf 121. An inner O-ring 127 provides sealing means between shaft 103 shelf 121. An outer O-ring 129 provides sealing means between shelf 121 and the inner wall 27 of fluid-filled magnet area 29. When pig signal 20 is triggered, the floating shelf 121 moves downward as the magnet 32 moves upward. A bleed screw 111 controls the amount of fluid in area 29. An O-ring washer 131 provides sealing means for the screw 111.

Last, FIG. 10 illustrates a preferred embodiment in which sealing means 80 is an inverted sliding piston 141. As with the other sliding designs, when pig signal 20 is triggered, piston 141 moves downward as the magnet 32 moves upward. A pair of inner and outer O-rings 143, 145 provide, respectively, sealing means against the shaft 147 of the magnet holder 149 and the inner wall 27 of the fluid-filled magnet area 29. A bleed screw 151 operates similar to that of bleed screw 111.

The preferred embodiments described above are not all possible embodiments of the invention. Therefore, the scope of the invention is defined by the following claims, including elements of the claims which a person of ordinary skill in the art would consider to be equivalent to, or no more than a trivial difference relative to, the elements listed in the claims.

What is claimed is:

1. A pipeline pig signal comprising:
   a trigger cavity internal to the pipeline pig signal and housing a magnet and at least a portion of a trigger;
   a sealing means located toward a lower end of the trigger cavity and above the housed portion of the trigger, the sealing means housing a pre-injected incompressible fluid that surrounds the magnet and arranged to prevent pipeline debris from coming into contact with the magnet.

2. A pipeline pig signal according to claim 1 further comprising the sealing means arranged for movement between a first sealing position and a second sealing position in response to trigger movement between a non-triggered and triggered position.

3. A pipeline pig signal according to claim 1 wherein the sealing means is a sliding piston.

4. A pipeline pig signal according to claim 1 wherein the sealing means is a floating shelf.

5. A pipeline pig signal according to claim 1 further comprising the sealing means being a rubber boot.

6. A system for preventing pipeline debris from entering a trigger cavity of a pipeline pig signal, the trigger cavity housing a trigger in communication with a pipeline product and two spaced-apart magnets, the system including a seal containing a pre-injected incompressible fluid and housed within the trigger cavity and located below the two spaced-apart magnets of the trigger cavity, the pre-injected incompressible fluid surrounding at least one of the two spaced-apart magnets, the seal arranged to remain in sealing engagement as the trigger moves between a non-triggered and a triggered position.

7. A pipeline pig signal having a trigger cavity, the pipeline pig signal comprising:
   a seal located toward a lower end of the trigger cavity and between a housed portion of a trigger and a lower magnet of a pair of magnets housed by the trigger cavity; the seal including a pre-injected incompressible fluid surrounding the lower magnet, the seal arranged to move in response movement of the trigger and prevent pipeline debris from entering a portion of the trigger cavity located above the seal.

* * * * *